United States Patent
Darling et al.

(10) Patent No.: US 8,048,582 B2
(45) Date of Patent: *Nov. 1, 2011

(54) EVAPORATIVELY COOLED HYBRID PEM FUEL CELL POWER PLANT ASSEMBLY

(75) Inventors: Robert M. Darling, South Windsor, CT (US); Michael L. Perry, Glastonbury, CT (US)

(73) Assignee: UTC Power Corporation, So. Windsor, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/925,840

(22) Filed: Nov. 1, 2010

(65) Prior Publication Data

US 2011/0045371 A1 Feb. 24, 2011

Related U.S. Application Data

(63) Continuation of application No. 12/002,815, filed on Dec. 19, 2007, now Pat. No. 7,887,966, which is a continuation-in-part of application No. 11/604,411, filed on Nov. 28, 2006, now Pat. No. 7,638,217, which is a continuation-in-part of application No. 11/027,332, filed on Dec. 29, 2004, now Pat. No. 7,504,170.

(51) Int. Cl.
*H01M 8/04* (2006.01)
(52) U.S. Cl. ........................................ 429/437; 429/446
(58) Field of Classification Search .................. 429/437, 429/446
See application file for complete search history.

(56) References Cited

U.S. PATENT DOCUMENTS

| | | | | |
|---|---|---|---|---|
| 5,700,595 A * | 12/1997 | Reiser | ........................... | 429/437 |
| 6,780,533 B2 * | 8/2004 | Yi et al. | ..................... | 429/437 X |
| 7,282,285 B2 * | 10/2007 | Couch et al. | .............. | 429/446 X |
| 7,887,966 B2 * | 2/2011 | Darling et al. | ................. | 429/437 |
| 2004/0170878 A1* | 9/2004 | Goebel | ............................ | 429/26 |
| 2005/0164049 A1* | 7/2005 | Cipollini | .......................... | 429/13 |

* cited by examiner

*Primary Examiner* — Stephen J. Kalafut
(74) *Attorney, Agent, or Firm* — Andrew Gathy

(57) ABSTRACT

A PEM fuel cell power plant includes fuel cells, each of which has a cathode reactant flow field plate which is substantially impermeable to fluids, a coolant source, and a fluid permeable anode reactant flow field plate adjacent to said coolant source. The anode reactant flow field plates pass coolant from the coolant sources into the cells where the coolant is evaporated to cool the cells. The cathode flow field plates prevent reactant crossover between adjacent cells. By providing a single permeable plate for each cell in the power plant the amount of coolant present in the power plant at shut down is limited to a degree which does not require adjunct coolant purging components to remove coolant from the plates when the power plant is shut down during freezing ambient conditions. Thus the amount of residual frozen coolant in the power plant that forms in the plates during shut down in such freezing conditions will be limited. The power plant can thus be restarted and brought up to full operating power levels quickly due to the reduced amount of frozen coolant that must be melted during startup. Pressure in the coolant source is preferably greater than ambient pressure, and pressure in the anode reactant flow field is greater than the pressure in the coolant source so as to prevent the coolant from flooding the cells. The power plant is well suited for use in powering vehicles.

7 Claims, 2 Drawing Sheets

EVAPORATIVELY COOLED HYBRID PEM FUEL CELL POWER PLANT ASSEMBLY

This application is a continuation of U.S. Ser. No. 12/002,815, filed Dec. 19, 2007, now U.S. Pat. No. 7,887,966, which in turn is a continuation-in-part of U.S. Ser. No. 11/604,411, filed Nov. 28, 2006, now U.S. Pat. No. 7,638,217, which in turn is a continuation-in-part of U.S. Ser. No. 11/027,332, filed Dec. 29, 2004, now U.S. Pat. No. 7,504,170.

TECHNICAL FIELD

The present disclosure relates to a polymer electrolyte membrane (PEM) fuel cell power plant which is evaporatively cooled by a water coolant. More particularly, this disclosure relates to a hybrid PEM fuel cell power assembly which employs fuel cells having one solid plate (the cathode plate) and one porous plate (the anode plate) in each cell wherein there will be minimal air gas ingestion into the water coolant stream by maintaining the coolant at a greater pressure than the cathode reactant air pressure. The coolant cools the cells by evaporating into the gas streams during operation of the power plant.

BACKGROUND

Polymer electrolyte membrane fuel cell assemblies are relatively low temperature, low operating pressure fuel cell assemblies that utilize a catalyzed polymer membrane electrolyte to process oxidant, typically air, and a hydrogen-rich fuel, or pure hydrogen, to produce electricity and water. PEM fuel cells are well suited for use in mobile applications such as automobiles, buses, and the like, because they are relatively compact, light in weight and can operate at essentially ambient pressure. They also have utility in stationary applications. The membrane in fuel cells of this type must be kept moist during operation of the fuel cells lest they dry out, and they also require that product water formed during the reaction be removed from the cells lest they flood.

One type of fuel cell system which uses solid reactant flow field plates with integral reactant flow field plates can be cooled by spraying water droplets into the reactant flow streams before they enter the cells. The resultant moisture in the reactant streams will evaporate in the cells and will thus cool the cells during operation of the power plant. The reactant streams will also sweep out product water from the cells so as to protect them from flooding. This cooling and water removal approach requires the inclusion of adjunct equipment for spraying the water droplets into the reactant streams, and also involves the inclusion of water impermeable reactant fluid flow plates on both the anode and cathode sides of the fuel cells so as to ensure that product water will be swept out of the cells by the exiting reactant fluid flow streams. This type of system also requires relatively high pressure drops to maintain the gas phase velocities required to entrain liquid water droplets in the flow. These high pressure drops in turn increase parasitic loads and lower system efficiency. Furthermore, imprecise control over local humidity levels can subject the membrane to mechanical stress and accelerate membrane failure. This type of system is typically purged of water during shutdown in freezing ambient conditions by purging the system with a dry gas until a substantial portion of the water remaining in the system has been evaporated and removed from the system. This method of preventing the formation of frozen coolant in the system during freezing conditions is not satisfactory because it results in a substantial drying of the membrane which severely limits performance of the cells on subsequent start, until the membrane is hydrated. Repeated use of this solution to the freeze problem will ultimately result in membrane degradation, because the membrane will degrade with humidity cycling.

Alternatively, another type of fuel cell system can utilize two porous plates. In this configuration, the porous anode and cathode separator plates serve to humidify the reactants. Under freezing conditions, when utilizing porous cathode and anode reactant flow field plates, the plates will not be purged of water, thus the water in the plates will freeze in situ after shutdown of the system. This eliminates the need for a long, energy-intensive purge and eliminates forced membrane humidity cycles which can deteriorate the membrane. Additionally, with a system using two porous plates, the internal resistance of the cells on restart is relatively low, meaning that high power can be drawn from the cells immediately upon restart.

One disadvantage with this type of system is that it is designed to work with two porous plates in each cell in the stack, both of which contain frozen water upon start, and therefore, it requires significant time and energy to thaw the frozen coolant in both plates. During the time when the internal cell water (frozen coolant) is thawing, there is no efficient way for removing product water from its point of generation in the cathode catalyst layer. The accumulation of water in the cathode catalyst layer and the adjacent gas diffusion layers will restrict gas access and thus reduce the maximum rate of power generation until the frozen coolant is thawed and a means of water removal is established. Once the frozen coolant thaws and the temperature of the cells climbs, full power can then be rapidly achieved.

Another disadvantage with this type of system is that when a circulated coolant, such as water, is used, the coolant stream can absorb gas from the reactant gas streams which can result in pump malfunctions, as well as rendering the coolant less efficient for its cooling function. Another disadvantage of a sub-ambient coolant loop is that it can be difficult to fill the loop on start.

It would be highly desirable to have a solution to both problems which would have both the advantages of the porous plate system but with much lower thermal mass and minimal reactant gas crossover during operation or shutdown, plus would result in a lower gas absorption into the coolant stream during operation of the power plant.

DETAILED DISCLOSURE

The fuel cell power plant of this invention is a PEM cell power plant which operates at relatively low operating temperatures and at reactant pressures which are at or above ambient pressure. The power plant of this disclosure is cooled by evaporation of a water coolant in the cells of the power plant. The cells as disclosed are evaporatively cooled by water supplied in coolant passageways. The passageways may comprise a material having in-plane (that is, parallel to the gas flow) permeability to water. The coolant passageways are sandwiched between the solid reactant oxidant gas flow field plates on the cathode side of each of the cells and water permeable reactant fuel gas flow field plates on the anode side of the adjacent cells in the power plant.

The coolant pressure of the water circulated through the coolant passageways may be established by a pump in the system. Coolant water passes from the coolant through the permeable anode flow field separator plate perpendicular to the plane thereof. The water travels only a very short distance from the water passageways through the porous anode plate material to the surface of the anode reactant channels where the water evaporates. The short distance can be less than 0.5 millimeters. This contrasts with a wicking distance of—approximately 10 cm for spray cooling.

A condenser can be employed and utilize ambient air or a liquid coolant, such as ethylene glycol, to cool the cathode exhaust. The amount of ambient air may be controlled in relation to the oxidant exhaust temperature from the cell stack.

The amount of gas which can enter into the coolant stream is minimized by having the water coolant pressure be greater than the cathode oxidant reactant pressure and greater than the ambient pressure. Thus, oxidant leakage into the coolant channels will be minimized.

BRIEF DESCRIPTION OF THE DRAWINGS

Various objects and advantages of this disclosure will become more readily apparent to one skilled in the art from the following detailed description of a preferred embodiment of the disclosure when taken in conjunction with the accompanying drawings in which.

SPECIFIC MODE FOR CARRYING OUT THE DISCLOSURE

Figure 1:
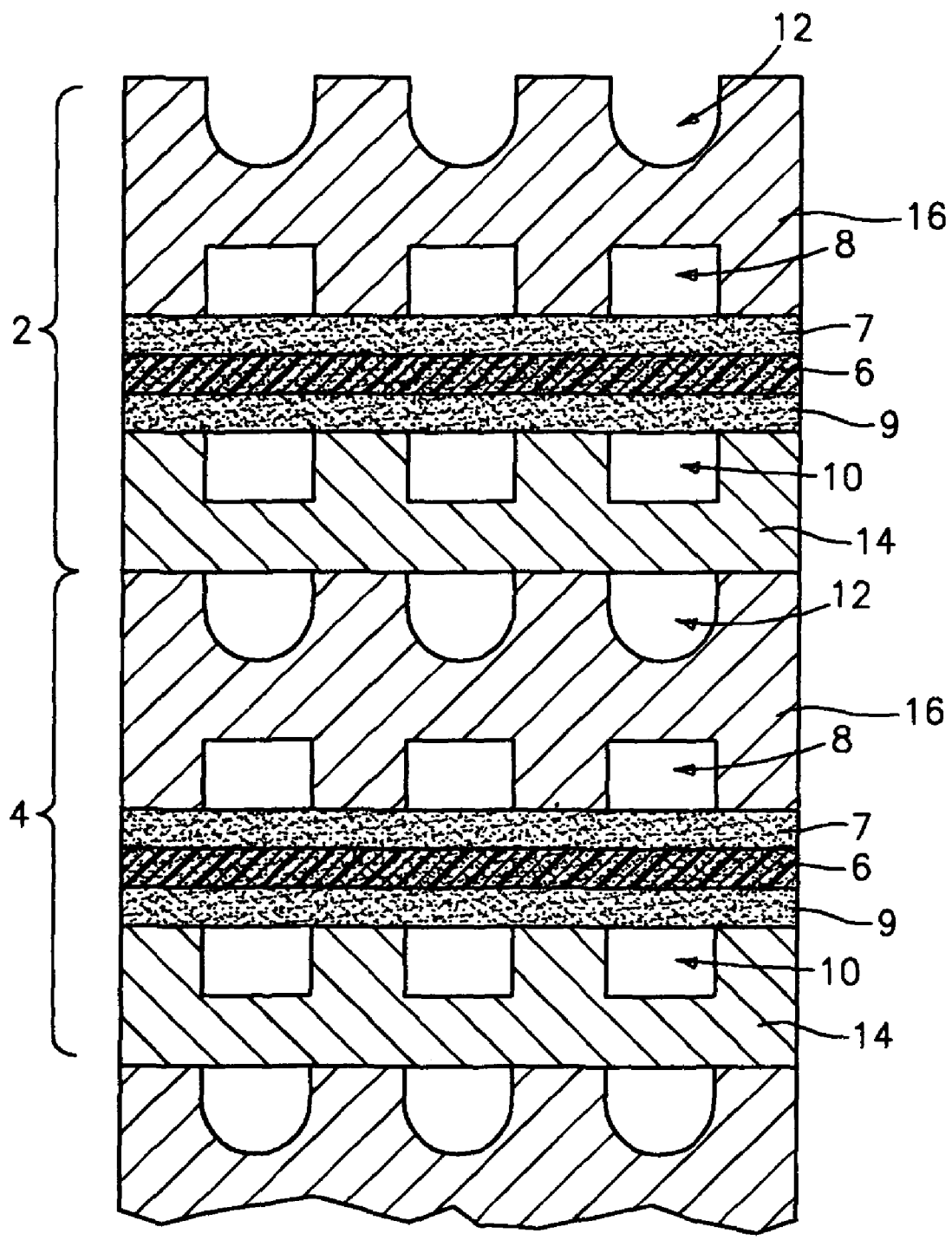
FIG. 1 is a cross sectional view of two adjacent hybrid fuel cell assemblies in a fuel cell power plant formed in accordance with this disclosure.

Referring now to the drawings, FIG. 1 is a schematic sectional view of two adjacent fuel cells 2 and 4 in a PEM cell power plant formed in accordance with this disclosure. The fuel cells 2 and 4 each include a catalyzed polymer electrolyte membrane (i.e., membrane electrode assembly (MEA) 6 which is interposed between an anode fuel reactant flow field 10 formed in plates 14, and a cathode oxidant reactant flow field 8 formed in plates 16. Porous gas diffusion layers 7 and 9 are disposed on either side of the MEA 6 so as to evenly distribute the fuel and oxidant reactants to the MEA 6 during operation of the power plant. Coolant passages 12 are preferably formed in the plates 16 and are disposed adjacent to the anode sides 10 of the fuel cells 2 and 4. It will be understood that the passages 12 could be formed in separate plates in the assembly, or could be formed in the portion of the plates 14 that face the plates 16, however, it is preferred to form the passages 12 in the plates 16 as shown in FIG. 1. The coolant passages 12 contain an aqueous coolant that serves to cool the PEM cell subassemblies 2 and 4 so as to maintain the proper operating temperature of the fuel cells 2 and 4.

The cooling is preferably performed by means of coolant water passing from the passages 12 through the water permeable plates 14 which form the anode flow fields 10. The coolant water thus penetrates into the plates 14. During the fuel cell operation, the hydrogen in the fuel and the oxygen in the oxidant are converted to electrons and product water. The water permeable plates 14 are operative to pass coolant water into the anode flow fields 10 and anode GDL. The coolant water moves through the gas diffusion layer 9, through the MEA 6 assisted by proton movement drag of water, and through the gas diffusion layer 7 into the cathode flow field 8 where water vapor is evaporated during operation of the power plant. Proton drag of water is a function of the flow of ionic current. The hydrogen is oxidized to H+ cation, or protons, and entrains molecules of membrane water as water of hydration during the proton transport through the MEA 6.

The plates 16 that form the cathode sides 8 of the fuel cells are substantially impermeable to fluids, particularly gases, i.e., have a less than ten percent void volume, so that neither water nor gases may penetrate them in a quantity that significantly increases the thermal mass, nor compromises the gas barrier.

During operation of the power plant, the plates 14 contain water. Some of that water will evaporate so as to cool the cells during operation of the power plant. During normal steady state operation, water will continue to be supplied to the plates 14 at a rate which is equal to the evaporation rate, thus, the plates 14 will contain sufficient water to form a wet seal (i.e., a barrier to gas). When the power plant is shut down, the plates 14 will still contain water but the plates 16 will not contain any substantial amounts of water. If the power plant is operating in a freezing environment, such as in a vehicle in the winter, when shut down occurs, the water in the plates 14 can and will freeze. Thus when the power plant is restarted in such an environment, the frozen coolant in the plates 14 must be melted before full power operation can be achieved. This melting of the residual water will take place by waste heat generated during the start procedure of the power plant without the need of any adjunct components in the system to accomplish the melting process. Melting of the frozen water in the assembly of this disclosure will require about 40-60% less energy than melting of frozen water in the two porous plate systems.

Figure 2:
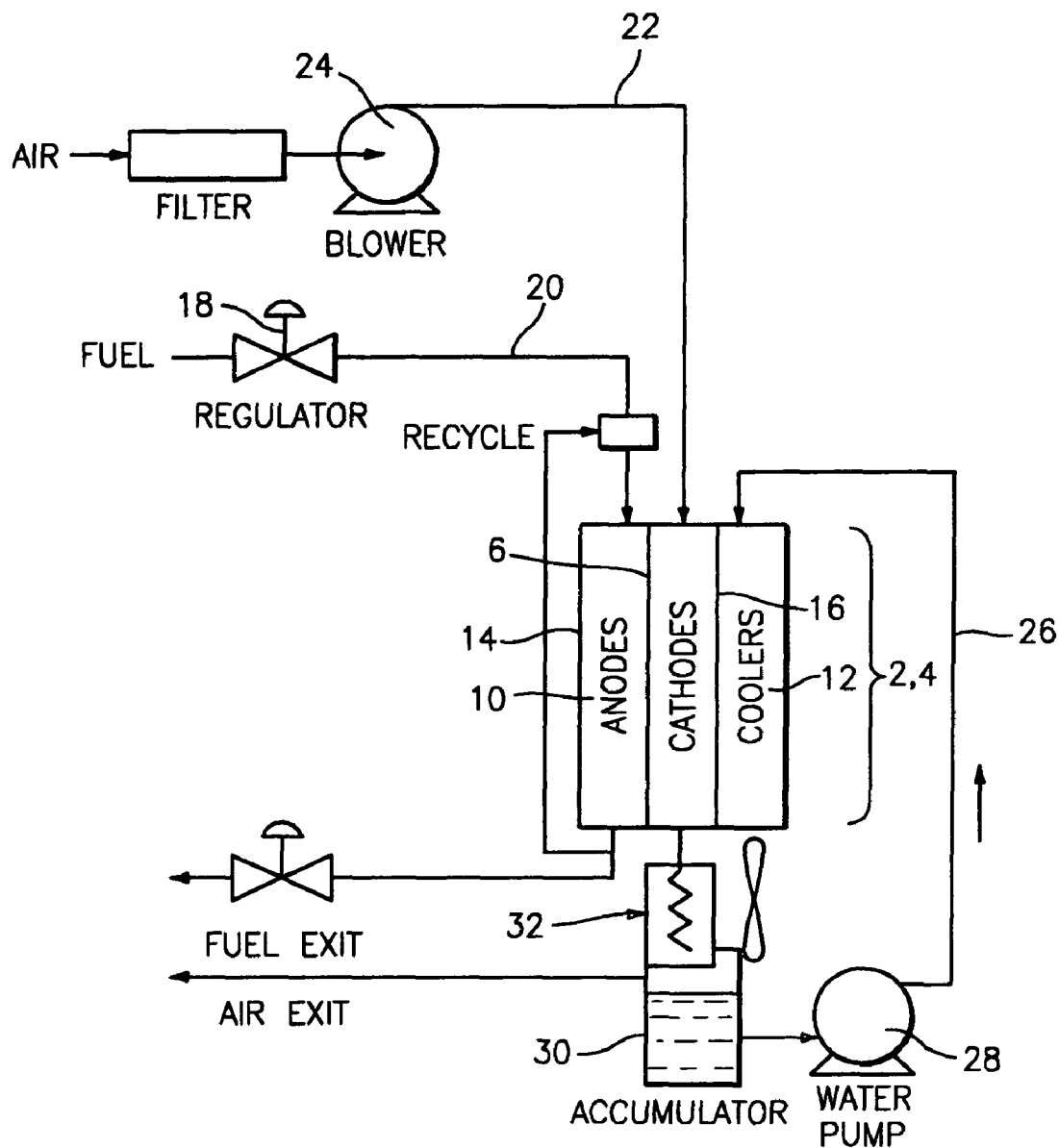
FIG. 2 is a schematic view of a portion of a fuel cell power plant employing the hybrid fuel cells and the evaporative cooling assembly of this disclosure.

Referring now to FIG. 2, there is shown an operating system for the fuel cell assemblies 2, 4, etc., which ensures minimal gas ingestion into the coolant stream. It will be understood that the coolant passages 12 are sandwiched between the cathodes plates 16 and the anode plates 14 in adjacent fuel cell assemblies 2, 4 in the power plant. Thus the water coolant in the passages 12 will be able to transport through the anode plates 14 to cool the fuel cell assemblies 2, 4, but will not be able to diffuse through the cathode plates 16. The fuel reactant stream is supplied to the anode sides 10 of the fuel cell assemblies 2, 4 through a valve 18 which controls the fuel stream pressure flowing through lines 20. The pressure of the oxidant stream flowing to the cathode sides 12 of the fuel cell assemblies 2, 4 etc. through the lines 22 is controlled by a blower 24. The system could also include a valve downstream to raise the operating pressure. The pressure of the coolant water in the coolant water feed line 26 and the coolant passages 12 is controlled by a water pump 28. The coolant water can be obtained from an accumulator 30 that accumulates product water which is condensed by a condenser 32 out of the cathode side outlet oxidant stream.

In order to minimize the amount of gas ingested into the coolant in the coolers 12 during operation of the power plant, the power plant is operated under conditions that ensure that the water coolant stream is at a higher pressure than the cathode oxidant reactant stream. The anode fuel gas reactant stream is at a greater pressure than the coolant stream in order to prevent the coolant from flooding the anode flow fields. The coolant pressure is preferably above ambient pressure to further minimize the amount of gas which is ingested into the coolant, for example, from external leaks in the coolant loop, and the coolant is circulated relatively slowly through the coolant passages to minimize the size of the coolant pump, the amount of parasitic power required for this circulation, as well as to enhance the evaporation of the coolant into the anode gas stream and removal of entrapped gas. The fact that the cathode plate is gas impervious allows the coolant pressure to be above ambient pressure and the cathode pressure since air cannot pass through the cathode plate into the coolant stream. Enabling the coolant stream to operate at above ambient pressure allows the system to be started much faster and is thus highly desirable for use in fuel cell power plants that are used to operate vehicles which must be relatively quickly started, even under subfreezing conditions.

We have determined that by employing only one water permeable reactant flow field plate in each cell in an evaporatively cooled PEM cell power plant, we can provide sufficient water from the coolant flow fields to properly cool the power plant to an appropriate operating temperature through evaporation of the coolant water in the cells. The coolant moves through the permeable reactant flow field plates toward the membrane in each cell. By having only one permeable plate for each cell in the power plant, we can limit the amount of coolant in the power plant at shut down and thus limit the amount of frozen coolant that may form in the power plant when the latter is shut down under ambient freezing conditions.

Additionally, by making the anode plate the permeable plate and the cathode plate the impermeable plate, we can limit the amount of gas which can be ingested by the coolant stream in the following manner. By maintaining the coolant pressure above ambient pressure and the oxidant gas pressure, but below the fuel gas pressure there is no flooding of the cell by the coolant stream. Under these operating conditions, the power plant can be relatively quickly started, and the coolant stream can be recirculated through the cells without ingesting substantial amounts of gas.

It will be readily appreciated that the fuel gas pressure should be higher than the coolant pressure since the anode plate is porous. The pressure differential is such that the coolant cannot pass through the anode plates and flood the cells. There is no concern about coolant passing through the cathode plates to flood the cells, since the cathode plates are impervious. Preferably, the coolant pressure should be greater than ambient pressure and the cathode pressure since this will minimize ingestion of air into the coolant loop from external leaks, and from the cathode flow field, respectively.

The primary advantage of minimizing gas ingestion is that excessive gas in the coolant loop can cause the coolant pump to fail or malfunction due to cavitations in the pump, which can lead to a power plant shutdown and/or failure. Another advantage of the subject coolant loop is that one can pump coolant into the coolant loop at a positive pressure instead of drawing the coolant through the coolant system with a pump, or other such devices, as required in sub-ambient pressure coolant loop systems. This makes system start easier, since getting a sub-ambient pressure system primed is bothersome.

Since many changes and variations of the disclosed embodiment of the disclosure may be made without departing from the inventive concept, it is not intended to limit the disclosure otherwise than as required by the appended claims.

What is claimed is:

1. A method for operating a PEM fuel cell power plant having a plurality of fuel cell assemblies, wherein each of said fuel cell assemblies comprises: a membrane electrode assembly (MEA); a pressurized cathode reactant flow field which includes a plate adjacent to one side of said MEA, said cathode reactant flow field plate being substantially impermeable to liquids; a pressurized anode reactant flow field which includes a plate adjacent to an opposite side of said MEA, said anode reactant flow field plate being permeable to liquids so that coolant can move through said anode reactant flow field plate; and coolant passages disposed adjacent to said anode reactant flow field plate, said coolant passages containing a pressurized coolant which is fed into said anode reactant flow field plate and said coolant is operative to evaporatively cool said fuel cell assemblies during operation thereof, said method comprising the step of maintaining a pressure in said anode reactant flow field which is greater than said coolant pressure in said coolant passages so as to ensure that said coolant will not flood the fuel cell assemblies.

2. The method of claim 1 wherein the coolant water pressure is greater than ambient pressure so as to minimize ingestion of ambient air into the coolant loop from external leaks.

3. The method of claim 1 further comprising the step of creating said coolant pressure by pushing coolant through said coolant passages with a pump.

4. The method of claim 3 wherein the pressure in said cathode reactant flow field is greater than ambient pressure.

5. The method of claim 1 wherein said coolant is water.

6. A PEM fuel cell assembly comprising: a membrane electrode assembly (MEA); a cathode reactant flow field plate adjacent to one side of said MEA, said cathode reactant flow field plate being substantially impermeable to liquids; an anode reactant flow field plate adjacent to an opposite side of said MEA, said anode reactant flow field plate being permeable to liquids so that water can move through said anode reactant flow field plate; coolant passages adjacent to said anode reactant flow field plate, said coolant passages containing a coolant which is operative to feed coolant to said anode reactant flow field plate and said coolant is operative to evaporatively cool said fuel cell assembly during operation thereof, said fuel cell assembly further comprising:
   a) first means for pressurizing said coolant passages to a first pressure which is operative to cause a coolant fluid in said coolant passages to circulate through said fuel cell assembly; and
   b) second means for pressurizing said anode reactant flow field to a second pressure which is greater than said first pressure, and which is operative to prevent said coolant fluid from flooding fuel cells in said fuel cell assembly.

7. The fuel cell assembly of claim 6 wherein said first means is operative to pressurize said coolant passages to a pressure that is greater than ambient pressure.

* * * * *